July 15, 1969

E. C. HUFF ET AL 3,455,169

MAGNETIC DENSIMETER

Filed July 6, 1967

INVENTORS
EARL C. HUFF
JOHN R. PATTEE
BY
Arnold, Roylance, Kruger & Durkee
ATTORNEYS July 15, 1969

E. C. HUFF ET AL 3,455,169

MAGNETIC DENSIMETER

Filed July 6, 1967

INVENTORS
EARL C. HUFF
JOHN R. PATTEE
BY Arnold, Roylance, Kruger & Durkee
ATTORNEYS

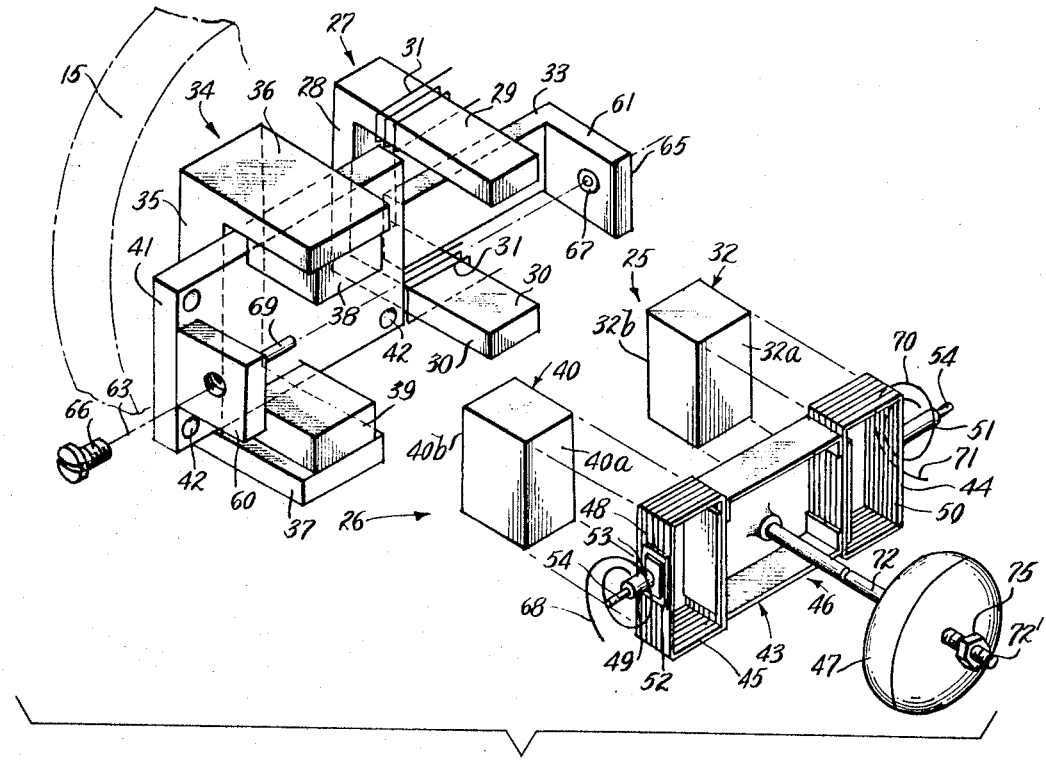

United States Patent Office 3,455,169
Patented July 15, 1969

3,455,169
MAGNETIC DENSIMETER
Earl C. Huff, Factoryville, Pa., and John R. Pattee, Poughkeepsie, N.Y., assignors to Weston Instruments, Inc., Newark, N.J., a corporation of Delaware
Filed July 6, 1967, Ser. No. 651,506
Int. Cl. G01n 9/30
U.S. Cl. 73—454                    19 Claims

ABSTRACT OF THE DISCLOSURE

A device, employing magnetic principles, for determining a fluid's density when the fluid is at rest. A moving assembly has a first coil disposed in an alternating magnetic field, second coil disposed in a permanent magnetic field, and a buoyant member subjected to a fluid sample, the moving assembly being rotatable about a reference axis. The buoyant member is spaced from and connected to the coils, and has a relative null position for a fluid of a particular density. Due to changes in the fluid's density, the buoyant member begins to move to a new position and produces a torque on the moving assembly, which in turn causes an alternating signal to be developed in the first coil due to its being rotated in the alternating field. This signal is rectified and applied to the second coil to produce a countertorque which balances the torque produced by the moving buoyant member, the buoyant member assuming a new null position and the rectified signal being indicative of the fluid's density.

---

This invention relates to magnetic densimeters, and more particularly to a device for determining a fluid's density in which the measurements are made rapidly with a high degree of accuracy and which is sufficiently rugged to be used under relatively severe environmental conditions.

It is known to identify fluids by their density and to use magnetic densimeters for this purpose. Prior art magnetic densimeters have usually employed a float with a permanent magnet and a ferrous core attached thereto, so that the magnet and core are movable vertically within a tubular portion of a housing as the position of the float changes with variations in fluid density. Externally surrounding the tubular portion is a coil fed by an oscillator and a solenoid spaced from the coil. As the position of the float changes with variations in density, the position of the magnet and core change with respect to the coil and solenoid, thereby changing the current signals in the coil and solenoid to produce a change in the magnetic field strength of the solenoid. While these prior art magnetic densimeters are relatively accurate, they have not proven fully satisfactory in that they are unduly cumbersome and depend upon a critical spatial relationship between a magnet and a core with respect to a coil and a solenoid.

Accordingly, an object of this invention is to provide an improved device for determining a fluid's density, in which the measurements are rapidly made with a high degree of accuracy and which is sufficiently rugged to be used under relatively severe environmental conditions. A related object is to provide such a device which can be economically manufactured.

Another object is to provide a magnetic densimeter in which all of the elements of the magnetic circuits are contained within a single housing. A related object is to provide such a densimeter having a compact housing structure.

Another object is to provide a magnetic densimeter in which all of the elements of the magnetic circuits are contained within a single housing. A related object is to provide such a densimeter having a compact housing structure.

Another object is to provide a magnetic densimeter which does not depend upon a critical spatial relationship between a fixed coil and solenoid with respect to a moving permanent magnet and core.

Magnetic densimeters according to the invention include a housing enclosing first magnetic means which present an alternating magnetic field and second magnetic means which presents a permanent magnetic field. A moving assembly includes a first coil disposed in the alternating magnetic field, a second coil disposed in the permanent magnetic field, and a buoyant member subjected to a fluid sample the density of which is to be measured. The first and second coils are mechanically interconnected and rotatable about a reference axis by the buoyant member which is attached to the coils. The buoyant member is spaced from the coils for movement in a path about the reference axis.

In the operation of the densimeter, the buoyant member moves, from a null position which it occupies in response to a fluid having a particular density, to a new position in response to a fluid having a different density. Such movement of the buoyant member produces a torque on the moving assembly, which causes a first signal to be generated in the first coil due to its being rotated in the alternating field, the first signal being fed to a circuit which produces a second signal in response thereto. The second signal is coupled to the second coil to produce a countertorque which balances the torque produced by the moving buoyant member, the buoyant member assuming a steady state position and the second signal being indicative of the fluid's density.

A feature of the invention is the provision of means for adjusting the moving assembly so that the initial null position of the buoyant member can be preselected for a particular density. Another feature of the invention is a temperature compensation circuit which adjusts the second signal, which represents the fluid's density at the actual temperature, to represent the density at a reference temperature.

In order that the manner in which the foregoing and other objects are attained in accordance with the invention can be understood in detail, a particularly advantageous embodiment thereof will be described with reference to the accompanying drawings, which form a part of this specification, and wherein:

FIG. 5 is an exploded perspective assembly view of the internal parts of the magnetic densimeter;

FIG. 6 is a detailed elevational view showing various positions that a buoyant member of the magnetic densimeter occupies in response to changes in density of the fluid to which it is subjected;

Figure 1:
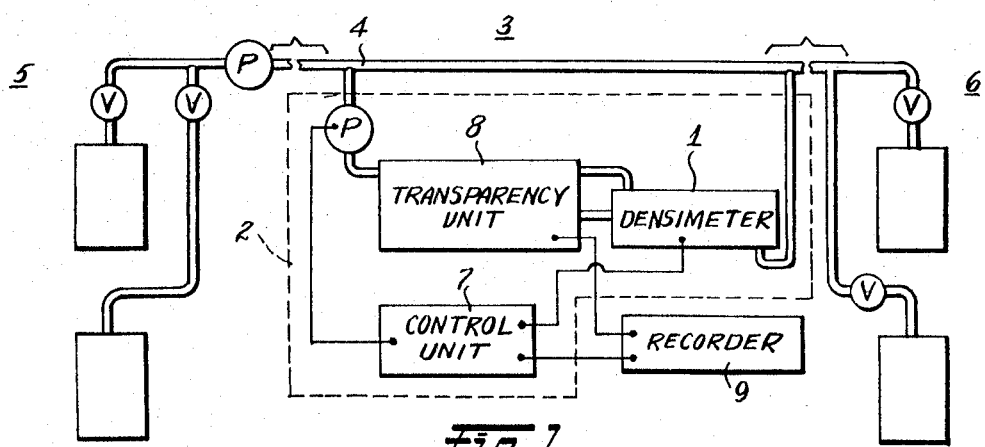
FIG. 1 is a diagram of a pipeline system including a product monitor in which a densimeter in accordance with the invention is employed.

In FIG. 1, a magnetic densimeter 1 according to the invention is shown as being a component of a pipeline product monitor 2. Monitor 2 is connected at a predetermined location 3 to a pipeline 4, which is part of a fluid handling system for transferring fluid products such as petroleum products, from an originating area 5 to a destination area 6.

Monitor 2, under the control of a control unit 7, extracts a sample of the fluid flowing in pipeline 4 and pumps it into a transparency unit 8 and densimeter 1 and permits the sample to come to a quiescent condition. Transparency unit 6 determines the light transmission characteristics of the sample and densimeter 1 determines the density thereof. Signals, generated by transparency unit 8 and densimeter 1 are representative, respectively, of the light transmission characteristics and density of the sample, and these signals are fed to a recorder 9 while the sample is at rest. After the signals are recorded, control unit 7 recycles monitor 2 for successive samples.

Figure 2:
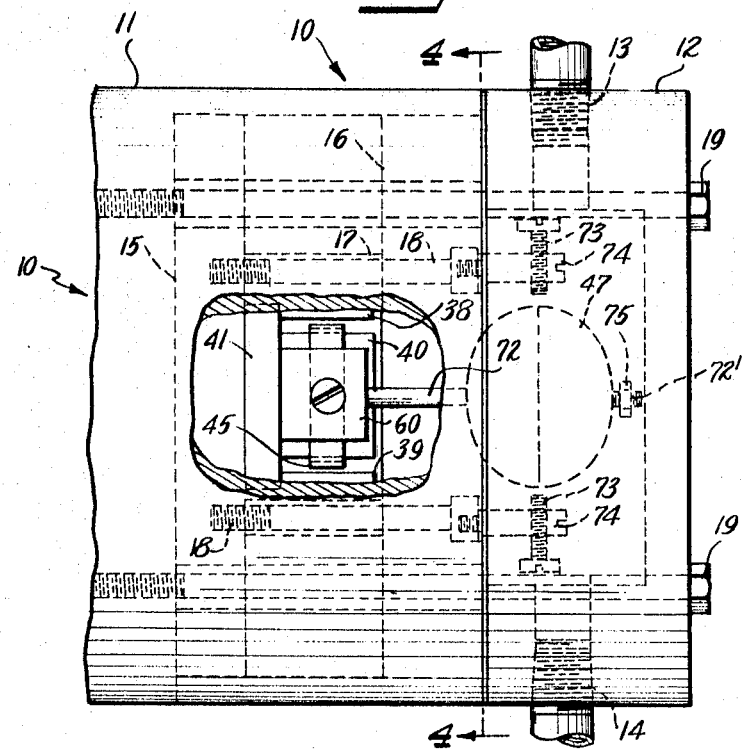
FIG. 2 is a side elevational view, with parts broken away for clarity, of a magnetic densimeter constructed in accordance with one particularly advantageous embodiment of this invention.

Referring now to FIG. 2, all of the parts of densimeter 1 are contained within a cylindrical housing 10 comprising a main body portion 11 and a cover 12, which has an inlet port 13 and an outlet port 14. Mounted within body portion 11 is a base plate 15 spaced from an end plate 16 by bushings 17, plates 15 and 16 being rigidly interconnected by machine screws 18. The assembly, comprising base plate 15, end plate 16, and bushings 17, is rigidly held within housing 10, and cover 12 is rigidly attached to body portion 11, by a plurality of machine screws 19.

As seen in FIG. 5, a first magnetic structure 25 and a second magnetic structure 26 are mounted on base plate 15 in spaced, parallel relationship.

Structure 25 includes a U-shaped core 27, made of a suitable magnetizable material and having a base portion 28 with spaced parallel legs 29 and 30 extending therefrom, base portion 28 being secured to base plate 15 by screws or other suitable means. Two coils 31 are each wound on a different one of legs 29 and 30, the coils being connected in a series aiding magnetic relationship (see FIG. 7).

Figure 4:
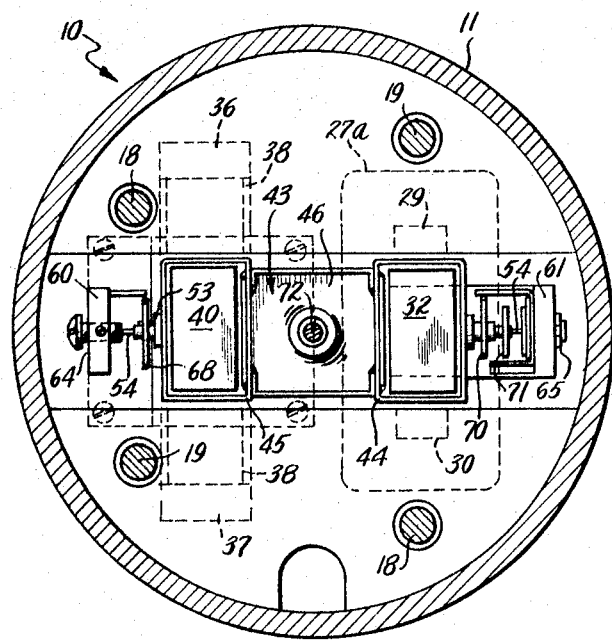
FIG. 4 is a view taken along line 4—4 of FIG. 1, showing various internal parts of the magnetic densimeter.

Disposed in the air gap between legs 29 and 30 is a rectangular core 32 made of magnetizable material. Core 32 has a depth (measured between surfaces 32a and 32b) such that when it is disposed in the air gap, surface 32a is in substantially the same plane as the end surfaces of legs 29 and 30, and there is a clearance between the side surfaces of the core and the legs (FIG. 4). A plate 33 of a suitable nonmagnetizable material is disposed between legs 29 and 30, and is rigidly secured to base portion 28. Core 32 can be disposed as described by providing a block (not shown) of an appropriate thickness between plate 32 and surface 32b of the core and securing the core thereto, or coils 31 and the portion of legs 29 and 30 which are surrounded thereby can be embedded in epoxy 27a (FIG. 4) and the core supported on a surface provided thereby.

Structure 26 includes a U-shaped soft iron yoke 34 of highly permeable, low retentivity, magnetic material. Yoke 34 has a base portion 35 with spaced, parallel legs 36 and 37 extending therefrom, base portion 35 being secured to base plate 15 by cement or other suitable means. Permanent magnet pole pieces 38 and 39 are rigidly attached respectively to the inside of legs 36 and 37, so that the pole pieces extend toward each other and define an air gap therebetween.

Disposed in the air gap between pole pieces 38 and 39 is a rectangular permanent magnet 40 which is secured to a support plate 41 by cement or other suitable means, plate 41 being made of a suitable nonmagnetizable material. Plate 41 is disposed between legs 36 and 37, so that its top surface is in intimate contact with pole pieces 38 and 39 and its bottom surface is in intimate contact with base portion 35 of the yoke, machine screws (not shown) being insertable through holes 42 to secure plate 41 to base plate 15 and to clamp base portion 35 to base plate 15. Magnet 40 is so dimensioned that, when it is disposed in the air gap between pole pieces 38 and 39, its end surface 40a is in substantially the same plane as the end surfaces of the pole pieces and there is a clearance between the side surfaces of the magnet and the pole pieces (FIG. 4).

Core 27 and yoke 34 are so arranged on base plate 15 that the right-hand end (as viewed in FIG. 5) of plate 41 overlies the left-hand end of plate 33, the plates being secured together at the place where they overlie by cement or other suitable means.

As will be understood from the foregoing, magnetic structures 25 and 26 are arranged in spaced parallel relationship on base plate 15, so that the air gaps between legs 29 and 30 of core 27 on one hand, and pole pieces 38 and 39 on the other hand, are parallel and spaced apart.

A moving assembly is indicated generally at 43 and includes a first or pickup coil 44, a second or torque coil 45, a support plate or pan 46, and a buoyant member 47. Coils 43 and 44 are each made up of a predetermined number of turns of wire wound in a rigid rectangular configuration. One side of each coil 43 and 44 is respectively secured to a side of the support pan, the coils and the pan being rigidly secured together by cement or other suitable means. Mounted on side 48 of coil 45 is a pivot base 49 and mounted on side 50 of coil 44 is a pivot base 51, the pivot bases being respectively cemented to a paper wafer 52 which in turn is cemented to the respective coil sides. Each pivot base includes a hub portion 53 having a pin 54 extending therefrom, pin 54 being press-fitted into a counterbore formed in the hub portion so that the pin can be considered fixed to the hub.

Torque coil 45 has inside perimeter dimensions slightly greater than the perimeter dimensions of permanent magnet 40, and pickup coil 44 has inside perimeter dimensions slightly greater than the perimeter dimensions of core 32. Thus, as best seen in FIG. 4, when moving assembly 43 is disposed within magnetic structures 25 and 26, pickup coil 44 loosely surrounds core 32 and torque coil 45 loosely surrounds magnet 40. When moving assembly 43 is so disposed, there are clearance spaces between pole pieces 38 and 39 and torque coil 45, and between legs 29 and 30 and pickup coil 44.

A wall structure 60 is secured transversely to the left-hand end of plate 41 (as viewed in FIGS. 4 and 5) and a wall structure 61 is secured transversely to the right-hand end of plate 33. These wall structures each have an aperture 62 therethrough, the apertures being aligned along a reference axis 63 (FIG. 5).

Moving assembly 43 is supported within structures 25 and 26 by means of support structures 64 and 65. Each support structure 64 and 65 includes an element, 66 and 67 respectively, having an axial counterbore formed therein and a low friction bearing (not shown) fixedly mounted within the counterbore, the ends of pins 54 being received in the bearing of the associated support structure. Support structure 64 is fixedly secured to wall structure 61 in any suitable manner, and support structure 64 is movably supported within the aperture in wall structure 60 to adjust for end play of moving assembly 43. Since moving assembly 43 is a rigid structure, it is supported for relative rotation about reference axis 63. This relative rotation of the moving assembly is of a limited degree, and is determined by the relative perimeter dimensions of magnet 40 and core 32 with respect to coils 45 and 44.

A light spiral spring 68 (FIGS. 4 and 5), made of electrically conductive material, arranged so that one of its ends is connected to a pin 69 mounted on wall structure 60 and is connected to one lead of torque coil 45. Two other conductive spiral springs 70 and 71, each being similar in construction to spring 68 are arranged so that one end of each coil is respectively connected to pins 69 (not shown) on wall structure 61. The other end of spring 70 is electrically connectable to one lead of pickup coil 44, and the other end of spring 71 is electrically connectable to the common lead of coils 44 and 45. The pins 69 are connected to external circuitry via internal wiring. Spiral springs 68, 70 and 71 are of such a construction that they do not apply any appreciable torque to the moving assembly.

Figure 3:
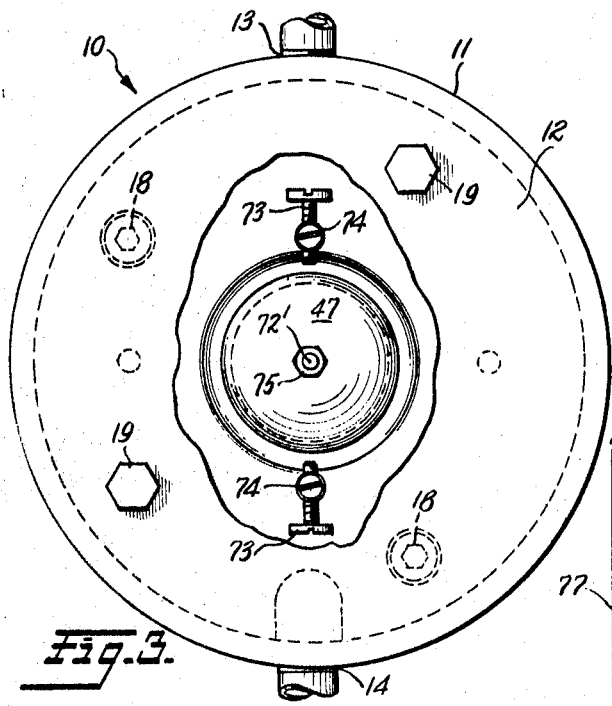
FIG. 3 is an end view, partly broken away, of the magnetic densimeter of FIG. 2.

An elongated rod 72 has one of its ends threadably secured to support pan 46, and its other end secured to buoyant member 47, which is positioned within housing 10 so that it is subjected to the fluid sample therein (FIG. 2). Buoyant member 47 is symmetrical with respect to rod 72, and can be made of plastic, stainless steel, or other suitable materials. As illustrated in FIGS. 5 and 6, buoyant member 47 has a somewhat spherical shape, which is compressed in a direction lengthwise of rod 72. The buoyant member has a weight such that when housing 10 is filled with a fluid sample having a particular or reference density, the buoyant member occupies a null position when rod 72 is substantially in a horizontal position. When the buoyant member is in the null position, coils 44 and 45 are also in a null position; that is, the coils are symmetrically disposed with respect to core 32 and magnet 40. As seen in FIGS. 2 and 3, a pair of stop members 73 are threadably mounted in oppositely disposed support members 74 mounted on plate 16. Stop members 73 may be plastic screws, and each is located a slight distance away from the buoyant member when it is in its null position. An adjustable nut member 75 threadably engages the free end of a rod 72', which is secured to buoyant member 42 and axially aligned with rod 72, so that the null position of the buoyant member can be finely adjusted by moving nut member 75 axially along shaft 72 with respect to the buoyant member, increasing or decreasing the torque arm length of the mass pivotably around axis 54.

Since the buoyant member is rigidly secured to rod 72 which is rigidly secured to support pan 46, and the pan is rigidly secured as part of moving assembly 43 which is rotatably supported along axis 63, the buoyant member is pivotably movable in an arcuate path about and spaced from axis 63 and its path of travel is determined by stop members 73. As seen in FIG. 6, the length of the arc through which then buoyant member travels is very small, and rod 72 has a length relative to the arc such that the path of travel of the buoyant member can, for practical purposes, be considered as a straight vertical line.

The interior of housing 10 defines a chamber for receiving the fluid sample, so that the fluid at least surrounds rods 72 and 72' and buoyant member 47, moving assembly 43, core 27 and magnet 34, wall structures 60 and 61, support structures 64 and 65, and spiral springs 68, 70 and 71. To more rigidly secure core 27 and permanent magnet 34 to base plate 15 and to reduce the volume of the fluid sample required to operate the densimeter, the interior of the housing between base plate 15 and end plate 16 can be filled with an insulating ceramic or other suitable material, except for the chamber defined by the interior area of the housing surrounding the above-mentioned parts.

Consider first the situation where the fluid, the density of which is to be determined, is at the reference temperature and the reference density. A sample of the fluid is led into housing 10 via inlet 13 (FIG. 2) to fill the chamber defined by the interior of the housing, the movement of the fluid driving buoyant member 47 towards the lower stop member 73 (FIG. 6). In addition to determining the extent of the path which the buoyant member travels, stop members 73 prevent damage to moving assembly 43 when fluid is led into the housing. Since the buoyant member is driven to the lower stop member 73 by the moving fluid and any signals generated while the fluid is flowing are therefore meaningless, the fluid is permitted to come to rest before a reading is taken.

Figure 7:
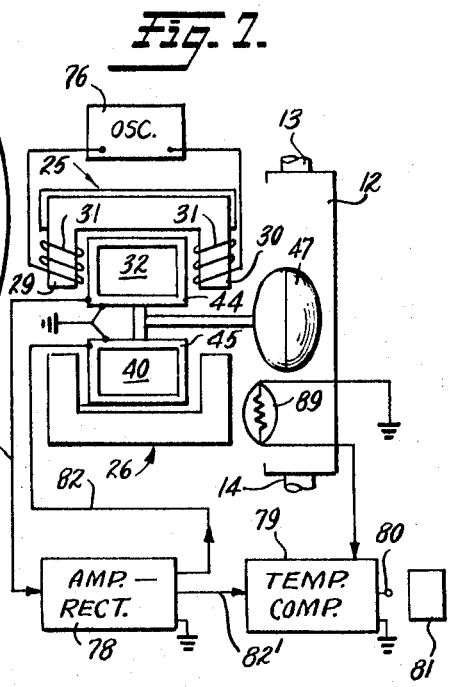
FIG. 7 is an electrical schematic diagram of the magnetic densimeter.

Referring now to FIG. 7, coils 31 are energized by an oscillator 76 to develop an alternating magnetic field in the air gap between legs 29 and 30 and in core 32 of magnetic structure 25. However, since the fluid sample is at the reference density and the reference temperature, buoyant member 47 and coils 44 and 45 are in the null position and no signals are induced in pickup coil 44. Since pickup coil 44 is connected via conductor 77 to an amplifier-rectifier circuit 78 and through a temperature compensation circuit 79 to an output terminal 80, no signals are delivered to the output terminal (which can be converted to an utilization device 81, such as voltmeter, recorder 19 (FIG. 1) or the like) because no signals are applied to the amplifier-rectifier and associated circuits.

As mentioned above, adjustable member 75 is provided for making a fine adjustment of the null position of buoyant member 47. If the buoyant member does not assume the precise null position for the reference density, output signals will be provided at output terminal 80, because pickup coil 44 is no longer symmetrically disposed with respect to core 32 (as in the case when the pickup coil is in the null position) and a signal is induced therein. Adjustable member 75 is movable inwardly or outwardly to precisely adjust the torque arm length until the buoyant member assumes the null position in response to the buoyant force of the fluid, which can be detected by there being no signals at the output terminal.

Now consider the situation when a new sample, at the reference temperature but having a density differing from the reference density, is pumped into housing 26 and comes to rest. Buoyant member 47 moves from the null position toward either the upper or the lower stop member 73, depending upon whether the density of the sample is greater than or less than the reference density. As the buoyant member moves from the null position, a torque is impressed on moving assembly 43 so that coils 44 and 45 are rotated about reference axis 63 (see FIG. 6 showing coil 45 only). During such rotation of the moving assembly, pickup coil 44 is angularly displaced through the alternating magnetic field of magnetic structure 25 so that an AC signal is induced therein. This signal is applied to amplifier-rectifier 78, which in turn applies or feeds back a rectified signal via a conductor 82 to torque coil 45, the rectified signal being an analog indication of the actual density of the fluid sample and bearing a linear relationship thereto. The polarity of this rectified signal is such that torque coil 45 produces a countertorque equal to the torque generated by the moving buoyant member, whereupon the buoyant member comes to a steady state position. The rectified signal is also applied to temperature compensation circuit 79, the purpose of which is to adjust the rectified signal (which represents the fluid's density at the actual temperature) so that it represents the density at the reference temperature. Since the fluid sample is at the reference temperature, this rectified signal appears unaltered at output terminal 80. Since spiral springs 68, 70 and 71 are very light in strength, they have substantially no torsional effect on the rotation of coils 44 and 45; hence, the spiral springs introduce no error into the rectified signal.

It will be understood that the actual travel of the buoyant member from its steady-state position to a new position in response to a change in density is very small, and in an actual embodiment the travel is limited by stop members 73 to a distance on the order of plus or minus $\frac{1}{32}$ inch. The cooperation of magnetic structure 25 with moving assembly 43 can be considered as a position detector circuit and that of magnetic structure 26 with moving assembly 43 can be considered as a torque-motor circuit. From the above, it will be appreciated that the interaction between the position detector circuit and the torque-motor circuit is continuous rather than being a distinct action and reaction. More particularly, as soon as the buoyant member begins to move from its null or steady state position, there is an immediate change in the AC signal in the pickup coil, which results in an immediate change in the rectified signal applied to the torque coil and to the balancing torque developed by the torque coil applied to the moving assembly.

Figure 8:
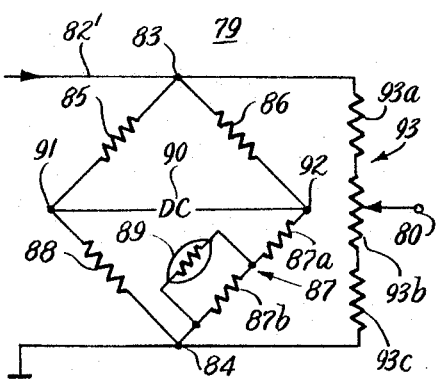
FIG. 8 is an electrical schematic diagram of a temperature compensation circuit embodied in the magnetic densimeter.

As mentioned above, compensation circuit 79 adjusts the rectified signal applied thereto, to a signal indicative of the fluid's density at the reference temperature, the temperature compensation circuit being shown in FIG. 8. When the fluid sample is at the reference temperature, the rectified signal is applied via conductor 82' to junctions 83 and 84 of a wheatstone bridge. The bridge has resistors 85–88 connected respectively in each leg thereof, and has a thermistor 89 connected across a portion 87b of resistor 87, a constant DC current source 90 being applied to junctions 91 and 92. The components of the bridge are chosen such that when the fluid sample is at the reference temperature, the bridge is balanced.

When the fluid sample is not at the reference temperature, the rectified signal is not representative of the sample's density and causes an unbalancing of the bridge. However, due to the effect of thermistor 89 (which is physically located in housing 10 so that it is subjected to the fluid therein, FIG. 7), the effective resistance of the leg of the bridge between junctions 84 and 92 is changed in response to the actual temperature of the sample, so that the output signal appearing at output terminal 80 represents the sample's density at the reference temperature. A potentiometer 93 is connected across junctions 83 and 84 for selectively adjusting the relative magnitude of the output signal at output terminal 80.

Thus, when the fluid has a density within a predetermined range of densities and is at the reference temperature which is within a predetermined range of temperatures, the bridge does not provide any signals which add to or substract from the analog rectified signal applied to terminals 83 and 84 because the bridge is substantially balanced over the predetermined density range for the reference temperature, the magnitude of the portion of the rectified signal appearing at output terminal 80 depending on the setting of potentiometer 93. However, when the fluid has a temperature other than the reference temperature, but within the predetermined temperature range, the bridge is unbalanced due to the effect of thermistor 89 and voltage signals are added to or subtracted from the analog signal applied to terminals 83 and 84 so that the signal appearing at output terminal 80 represents the density of the fluid at the reference temperature. The variation in density of the fluid due to temperature variations from the reference temperatures are counteracted by the compensating signals injected into the analog signal at junctions 83 and 84 due to the effect of thermistor 89.

During research conducted in the development of the densimeter of this invention, a network analysis of temperature compensation circuit 79 defied solution for determining a particular thermistor 89 to be employed therein. It was therefore necessary to resort to an empirical analysis. For at least a certain class of fluids, such as petroleum products, it was found that the density of the fluid varied substantially linearly with temperature coefficient within the density and temperature ranges of interest. This indicated that a constant compensating current could be delivered to junctions 91 and 92 which would result in compensating signals being provided to junctions 83 and 84 which would be algebraically added to the analog signal applied to junctions 83 and 84. A calibrated variable resistance element was used to simulate the varying resistance of a particular thermistor over the temperature range of interest, the thermistor having a known temperature-resistance curve. A typical analog signal, representing the density of a fluid within the density range, was applied to junctions 83 and 84; the calibrated resistance was set to simulate the thermistor at some temperature other than the reference temperature; and a constant DC current was applied to junctions 91 and 92, the polarity of the DC current causing the signal across junctions 83 and 84 to increase. By increasing the magnitude of the analog signal applied to junctions 83 and 84 (to simulate a higher density) and by increasing the magnitude of the DC current applied to junctions 91 and 92, it was found that the variations in the signal across junctions 83 and 84 decreased even though the calibrated resistance was varied to simulate the thermistor at various temperatures. Proceeding in this manner, a value of DC current applied to junctions 91 and 92 was found for which the signal across junctions 83 and 84 was not affected by variations in the calibrated resistance when simulating the thermistor over the temperature range of interest.

In an actual embodiment of the densimeter of this invention, the reference temperature was 60° F. in a temperature range of 20° F. to 100° F., and the specific gravity (which is correlatable to density) for the petroleum products of interest ranges from 0.8762 to 0.6690. Under these conditions, readings taken at output terminal 80 of a laboratory model of the densimeter were accurate to 0.1% when checked by other laboratory analysis, and for a production model 1.0% for most of the temperature range. The values of the elements for an actual embodiment of the production model of the temperature compensation circuit were:

| | |
|---|---|
| $R_{85}$ | 50 ohms. |
| $R_{86}$ | 102 ohms. |
| $R_{87a}$ | 63.4 ohms. |
| $R_{87b}$ | 82 ohms. |
| $R_{88}$ | 50 ohms. |
| $R_{93a}$ | 10K ohms. |
| $R_{93b}$ | 1.2K ohms. |
| $R_{93c}$ | 500 ohms. |
| Thermistor 89 | Veco #15J1 (Type A) or Fenwal CB 15j1. |
| DC current source 90 | 14–20 ma. |

From the foregoing it will be appreciated by those skilled in this art that temperature compensation circuit 79 is more than just a Wheatstone bridge. Circuit 79 can be viewed as a special Wheatstone bridge in which two current signals are applied at opposite pairs of junctions thereof. One current is the constant DC current applied to junctions 91 and 92 and the other current is the variable rectified analog signal (representative of the fluid sample's actual density) applied to junctions 83 and 84.

Although the term "density" has been used in describing the invention, it will be obvious to those skilled in the art that the term "specific gravity" could have just as well been used, since these terms are correlatable.

It is to be understood that the above described embodiment is merely illustrative of the principles of the invention and that various modifications and changes can be made without departing from the scope of the invention.

What is claimed is:

1. A density determining device, comprising: a housing; first means disposed within said housing for providing an alternating magnetic field; second means disposed within said housing for providing a permanent magnetic field; a moving assembly including a first coil disposed in the alternating magnetic field, a second coil disposed in the permanent magnetic field, the coils being mechanically interconnected and rotatable about a reference axis, and a buoyant member attached to said coils and spaced therefrom for movement in a path about the reference axis, said buoyant member being subjected to a fluid the density of which is to be measured; means associated with said buoyant member for adjusting the buoyant member so that it assumes a null position when subjected to a fluid having a particular density, said buoyant member moves from the null position to cause rotation of said moving assembly and a first signal is induced in said first coil as it is rotated in the alternating magnetic field; and means for electrically intercoupling said first and second coils and for producing a second signal in response to the first signal, the second signal being coupled to said second coil to produce a countertorque which balances the torque produced by said buoyant member during its movement so that said buoyant member assumes a steady state position, the second signal being representative of the fluid's density.

2. A density determining device according to claim 1, further comprising: means responsive to the second signal for indicating the fluid's density.

3. A density determining device according to claim 1, wherein said first coil and said second coil are interconnected by a support member to which said buoyant member is attached.

4. A density determining device according to claim 1, wherein said second signal producing means comprises: an amplifier for amplifying the first signal; and a rectifier for rectifying the first signal to produce the second signal.

5. A density determining device according to claim 1, further comprising: a temperature compensation circuit coupled to said second signal producing means for adjusting the second signal, which represents the fluid's density at its actual temperature, to produce an output signal which represents the fluid's density at a reference temperature.

6. A density determining device according to claim 5, wherein said temperature compensation circuit comprises: a resistive wheatstone bridge; an element the resistance of which varies with temperature connected in one leg of the bridge, said element being subject to the fluid sample, a constant direct current being applied across one oppositely disposed pair of bridge junctions, and the second signal being applied across the other oppositely disposed pair of bridge junctions, the output signal being produced at said other opposite pair of bridge junctions.

7. A density determining device according to claim 6, wherein said variable resistance element is connected in parallel relationship with a resistor in said one leg of said bridge.

8. A density determining device according to claim 7, wherein variable resistance element is a thermistor.

9. A device for measuring the density of a fluid, including a housing having an inlet port and an outlet port, comprising: a buoyant member located in the housing and immersed in the fluid the density of which is to be determined, said buoyant member having a null position in the housing for a given fluid density and being mounted therein for movement about a reference axis spaced therefrom; means associated with said buoyant member for adjusting said buoyant member so that it assumes the null position for the reference density; first magnetic means disposed in the housing for providing an alternating magnetic field; second magnetic means disposed in the housing, spaced from said first magnetic means, for providing a permanent magnetic field; a pickup coil disposed in the alternating magnetic field; a torque coil disposed in the permanent magnetic field, said coils being mechanically interconnected and connected to said buoyant member which is spaced therefrom for rotation about the reference axis, so that when said buoyant member is immersed in a fluid having a density different from the given density, said buoyant member moves from the reference position and causes said coils to be rotated, a first signal being generated in said pickup coil due to its rotation in the alternating magnetic field; and circuit means responsive to the first signal for producing a second signal and for coupling the second signal to said torque coil to produce a countertorque which balances the torque produced by said buoyant member during its movement, so that said buoyant member assumes a steady state position, the second signal being representative of the fluid density.

10. A density measuring device according to claim 9, further comprising means responsive to the second signal for indicating the fluid density.

11. A density measuring device according to claim 9, wherein said circuit means comprises an amplifier for amplifying the first signal and a rectifier for rectifying the first signal to produce the second signal.

12. A density determining device according to claim 9, further comprising a temperature compensating circuit coupled to said circuit means for adjusting the second signal, which represents the fluid's density at the fluid's actual temperature, to produce an output signal which represents the fluid's density at a reference temperature.

13. A density determining device according to claim 12, wherein said temperature compensation circuit comprises a Wheatstone bridge having a resistor in each leg thereof; and a thermistor connected in parallel relationship with a resistor in one of said bridge legs, one pair of oppositely disposed bridge junctions being connected to said circuit means for receiving the second signal, and the other pair of oppositely disposed bridge junctions being connected to a constant direct current source, the output signal being developed at said one pair of oppositely disposed bridge junctions.

14. A density measuring device according to claim 9, wherein said coils are rigidly interconnected by a support member in such a manner that said coils are separated by said support member along the reference axis and in a relative common plane, and wherein said buoyant member is attached to said support member by a rod-like member at right angles thereto.

15. A density measuring device according to claim 14, wherein said adjusting means comprises a nut member movable along a shaft-like member extending from said buoyant member and axially aligned with said rod-like member.

16. A density measuring device according to claim 15, further comprising stop members disposed in the housing to limit the travel path of said buoyant member.

17. A density measuring device according to claim 16, further comprising: first, second and third conductive spring members, each spring member having one end thereof respectively connected to the first lead of said pickup coil, to the first lead of said torque coil, and to the second lead of said pickup coil and said torque coil, the other end of each of said spring members being respectively connected to the input of said circuit means, to the output of said circuit means, and to ground.

18. A density determining device according to claim 14, wherein said buoyant member is in the null position when said rod-like member connecting said buoyant member to said support member is in a horizontal position.

19. A density determining device according to claim 18 wherein said first magnetic means and said second magnetic means are arranged within the housing in such a manner that the alternating magnetic field is spaced from and parallel to the permanent magnetic field.

References Cited

UNITED STATES PATENTS

| | | | |
|---|---|---|---|
| 2,887,636 | 5/1959 | La Hue et al. | 318—28 |
| 3,111,850 | 11/1963 | Anderson | 73—517 |
| 3,350,945 | 11/1967 | Bristol | 73—398 |

RICHARD C. QUEISSER, Primary Examiner

C. E. SNEE III, Assistant Examiner

U.S. Cl. X.R.

73—398, 517; 318—32